United States Patent
An et al.

(10) Patent No.: US 8,019,635 B2
(45) Date of Patent: Sep. 13, 2011

(54) ADAPTIVE PRODUCT CONFIGURATION MODEL

(75) Inventors: Lianjun An, Yorktown Heights, NY (US); Feng Cheng, Chappaqua, NY (US); Thomas Robert Ervolina, Poughquag, NY (US); Markus Ettl, Yorktown Heights, NY (US); Pu Huang, Yorktown Heights, NY (US); Laurence Allan Phillips, Cary, NC (US); Karthik Sourirajan, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 12/052,440

(22) Filed: Mar. 20, 2008

(65) Prior Publication Data

US 2009/0240545 A1    Sep. 24, 2009

Related U.S. Application Data

(63) Continuation of application No. 11/038,536, filed on Jan. 21, 2005, now abandoned.

(51) Int. Cl.
   *G06Q 10/00* (2006.01)
(52) U.S. Cl. .............. 705/7.23; 705/22; 705/28; 705/29
(58) Field of Classification Search ..................... None
   See application file for complete search history.

(56) References Cited

U.S. PATENT DOCUMENTS

| | | | |
|---|---|---|---|
| 5,630,070 A * | 5/1997 | Dietrich et al. | 705/7.23 |
| 6,216,109 B1 * | 4/2001 | Zweben et al. | 705/7.12 |
| 6,278,978 B1 * | 8/2001 | Andre et al. | 705/7.13 |
| 6,574,717 B1 * | 6/2003 | Ngai et al. | 711/147 |
| 6,681,990 B2 * | 1/2004 | Vogler et al. | 235/385 |
| 6,843,415 B2 * | 1/2005 | Vogler | 235/385 |
| 6,845,909 B2 * | 1/2005 | Bong et al. | 235/385 |
| 6,850,809 B1 * | 2/2005 | Callar et al. | 700/96 |
| 6,866,195 B2 * | 3/2005 | Knowles et al. | 235/385 |
| 7,043,321 B2 * | 5/2006 | Ruml et al. | 700/100 |
| 7,050,953 B2 | 5/2006 | Chiang et al. | |
| 7,055,741 B2 * | 6/2006 | Bong et al. | 235/382.5 |
| 7,058,587 B1 * | 6/2006 | Horne | 705/7.22 |
| 7,072,723 B2 | 7/2006 | Kohn et al. | |
| 7,171,376 B2 * | 1/2007 | Ramakrishnan | 705/7.31 |
| 7,209,869 B1 * | 4/2007 | Kroger et al. | 703/1 |
| 7,210,624 B1 * | 5/2007 | Birjandi et al. | 235/385 |
| 2002/0065764 A1 * | 5/2002 | Brodersen et al. | 705/37 |
| 2002/0116281 A1 * | 8/2002 | Costello et al. | 705/26 |
| 2002/0138316 A1 * | 9/2002 | Katz et al. | 705/7 |
| 2002/0165782 A1 * | 11/2002 | Falkenstein et al. | 705/22 |

(Continued)

OTHER PUBLICATIONS

"A hybrid dynamic programming/depth-first search' algorithm, with an application to redundancy allocation" NG, Kevin Y. K.; Sancho, N. G. F. IIE Transactions, 33, 12, 1047 Dec. 2001.*

(Continued)

*Primary Examiner* — Romain Jeanty
*Assistant Examiner* — Gurkanwaljit Singh
(74) *Attorney, Agent, or Firm* — Whitham, Curtis, Christofferson & Cook, P.C.; Stephen C. Kaufman

(57) ABSTRACT

The adaptive product conditioning is a computer-implemented method for identifying product configurations that can be provided to customers in reaction to supply imbalances. The methodology uses data mining techniques to collect and analyze business level meta data to coordinate supply and sales goals in terms of optimizing profits or managing product and technology transitions.

7 Claims, 3 Drawing Sheets

U.S. PATENT DOCUMENTS

| | | | |
|---|---|---|---|
| 2003/0061088 A1* | 3/2003 | Sarlay et al. | 705/9 |
| 2003/0105684 A1* | 6/2003 | Dunn et al. | 705/28 |
| 2003/0158769 A1* | 8/2003 | Uno et al. | 705/8 |
| 2004/0024628 A1* | 2/2004 | Eck et al. | 705/8 |
| 2004/0084526 A1* | 5/2004 | Knowles et al. | 235/385 |
| 2004/0084527 A1* | 5/2004 | Bong et al. | 235/385 |
| 2004/0158508 A1* | 8/2004 | Uehara et al. | 705/28 |
| 2005/0060270 A1* | 3/2005 | Ramakrishnan | 705/400 |
| 2005/0075949 A1 | 4/2005 | Uhrig et al. | |
| 2005/0103842 A1* | 5/2005 | Bong et al. | 235/385 |
| 2005/0177467 A1* | 8/2005 | Wang et al. | 705/28 |
| 2006/0031084 A1* | 2/2006 | Schierholt et al. | 705/1 |
| 2007/0100881 A1* | 5/2007 | McDonald et al. | 707/104.1 |
| 2007/0185760 A1* | 8/2007 | Birjandi et al. | 705/10 |
| 2007/0185786 A1* | 8/2007 | Ettl et al. | 705/28 |
| 2007/0282618 A1* | 12/2007 | Barahona et al. | 705/1 |
| 2008/0040185 A1* | 2/2008 | Birjandi et al. | 705/8 |
| 2009/0164285 A1* | 6/2009 | Hurtis et al. | 705/8 |

OTHER PUBLICATIONS

"Managing product variety in multinational corporation supply chains: A simulation study" Er, Mahendrawathi; MacCarthy, Bart Journal of Manufacturing Technology Management ? v17n8 ?pp. 1117-1138; 2006.*

"Measuring maintenance performance using a balanced scorecard approach" Alsyouf, Imad Journal of Quality in Maintenance Engineering ? v12n2 ?pp: 133-149; 2006.*

"On the integrated production, inventory, and distribution routing problem." Lei, Lei; Liu, Shuguang; Ruszczynski, Andrzej; Park, Sunju IIE Transactions , 38 , 11 , 955(16); Nov. 2006.*

* cited by examiner

ADAPTIVE PRODUCT CONFIGURATION MODEL

CROSS-REFERENCE TO RELATED APPLICATIONS

This application is a continuation application of U.S. patent application Ser. No. 11/038,536 filed Jan. 21, 2005, now abandoned.

BACKGROUND OF THE INVENTION

1. Field of the Invention

The present invention generally relates to supply chain management and product offering conditioning and, more particularly, to identifying alternative products or substituting components that can be provided to customers in reaction to supply imbalances.

2. Background Description

Supply-Demand conditioning is a decision process within the supply-demand planning process that monitors imbalances between supply and demand and recommends corrective actions before an imbalance becomes a threat to customer service. To resolve an imbalance situation, the decision maker needs to choose the appropriate corrective action. These actions fall into three categories:

Supply conditioning: Working with suppliers to improve flexibility in supply to react to customer demand that is never totally predictable.

Demand conditioning: Providing dynamic sales plans that can be changed in reaction to supply imbalances. Considers pricing actions and promotions to provide incentives to customers to choose alternatives.

Product offering conditioning: Identifying alternative product configurations in reaction to supply imbalances. Supported by a proactive product definition phase that provides more flexibility to define product configurations.

SUMMARY OF THE INVENTION

The subject invention provides a method that finds product offering alternatives to better coordinate supply and sales, and developing optimal build plans that would best utilize component inventories. This method is most appropriate for use in an assembly environment. It would not only enable proactive coordination of supply and sales in terms of optimizing profit, but also help manage major product and technology transitions.

It is an exemplary object of the present invention to provide a computer-implemented method that obtains meta data from a variety of databases and other information sources that relate to but is not limited to existing product configurations, marketing and sales goals and revenue targets, and logistics and provisioning levels.

Another exemplary object of the invention is to identify possible alternative product offerings to manage supply side imbalances at a component or other logistical level.

It is still a further exemplary object to analyze business level as well as operational level thresholds to rate and select specific product configurations that maximize financial goals while minimizing asset liabilities.

It is another object of the invention to provide product configuration data to the various business level organizations and update the related databases to incorporate the conditioning information.

According to the invention, there is provided a computer-implemented methodology that assesses a myriad of business and operation level data to maximize revenues and other business goals while minimizing the liabilities associated with supply imbalances and other operational and tactical goals.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
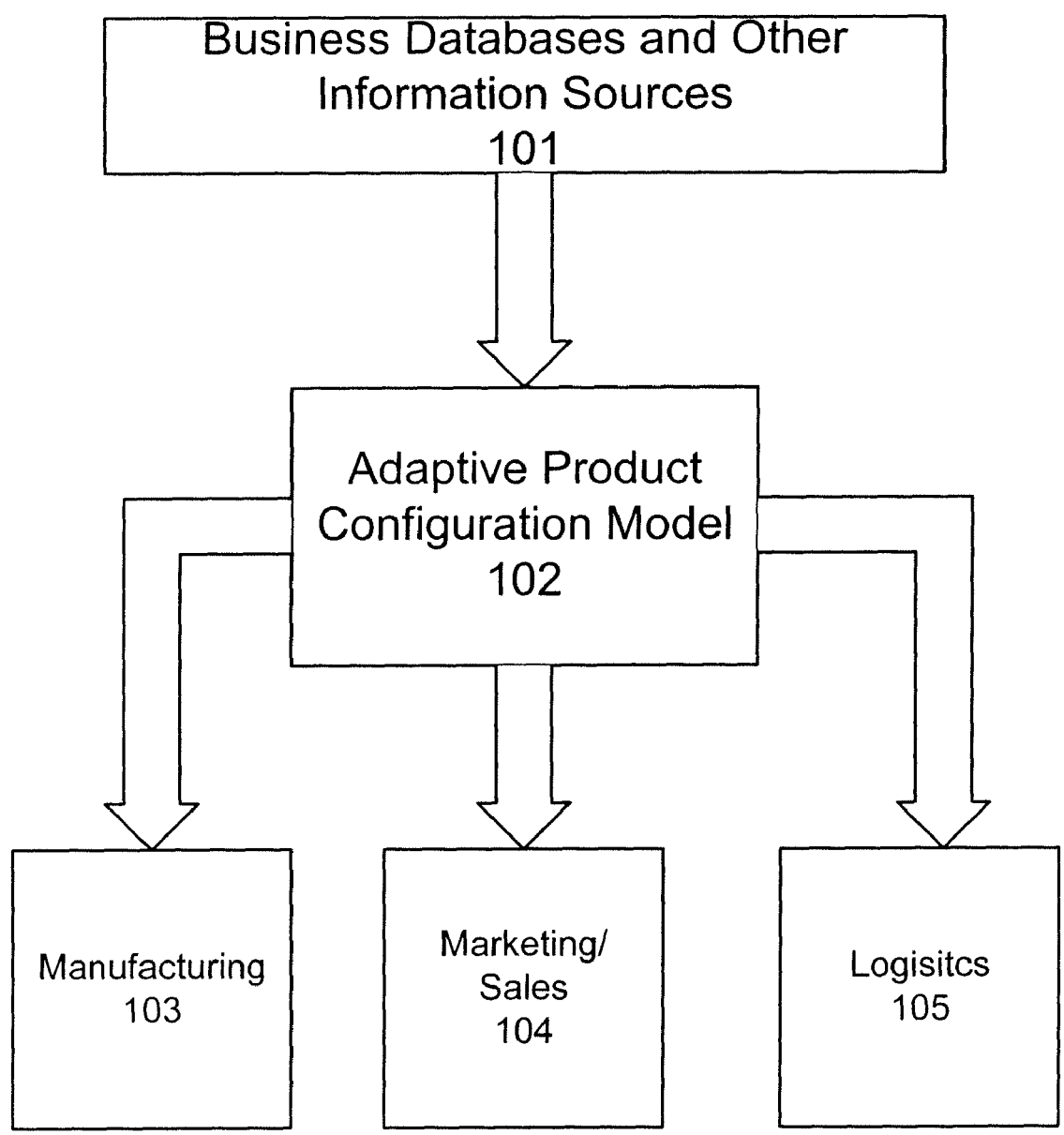
FIG. 1 is a block diagram illustrating the Adaptive Product Conditioning model according to the invention.

Referring now to the drawings, and more particularly to FIG. 1, there is a block diagram of the Adaptive Product Conditioning Model according to the invention which includes a computer-implemented method for taking business and operational data as an input and providing specific product configurations which meet business goals such as but not limited to those identified as part of sales planning, manufacturing planning (also called build planning), and customer support planning.

FIG. 1 shows business databases and other information sources 101 as the input to the Adaptive Product Configuration Model 102. The type of information obtained by the Adaptive Product Configuration Model 102 from the business databases and other information sources 101 would include but not be limited to technical, financial, logistical, and customer data. This data could be classified in many ways to include information defining available physical assets, costs of the available assets, customer demands for the assets and price points for the assets.

Once these data are obtained and classified, the Adaptive Product Configuration Model 102 analyzes the data and produces product configuration alternatives. These alternatives are rated based on strategic and tactical planning requirements and other business thresholds. The Adaptive Product Configuration Model 102 will then produce any one of several outputs. These outputs can be in the form of reports and/or automatic updates of source information databases. For example, a report could be provided to manufacturing 103 that contains detailed 'build to' product configuration data. Manufacturing 103 could use this data to construct the new recommended product configurations. Reports (either manual or automated) could also be provided to the marketing/sales 104 organizations to describe the new product configurations that would be available for sale. The sales/marketing 104 functions within the company could use the data to update sales and marketing plans and provide targeted promotions and sales incentives to sell the new product configurations. Another possible output would be to the logistics 105 function within the company. This data could also be either manual or electronic as in automatic database updating and would enable the logistics 105, distribution and other end provider organizations to reallocate supply to meet the new product configuration support and distribution requirements.

Figure 2:
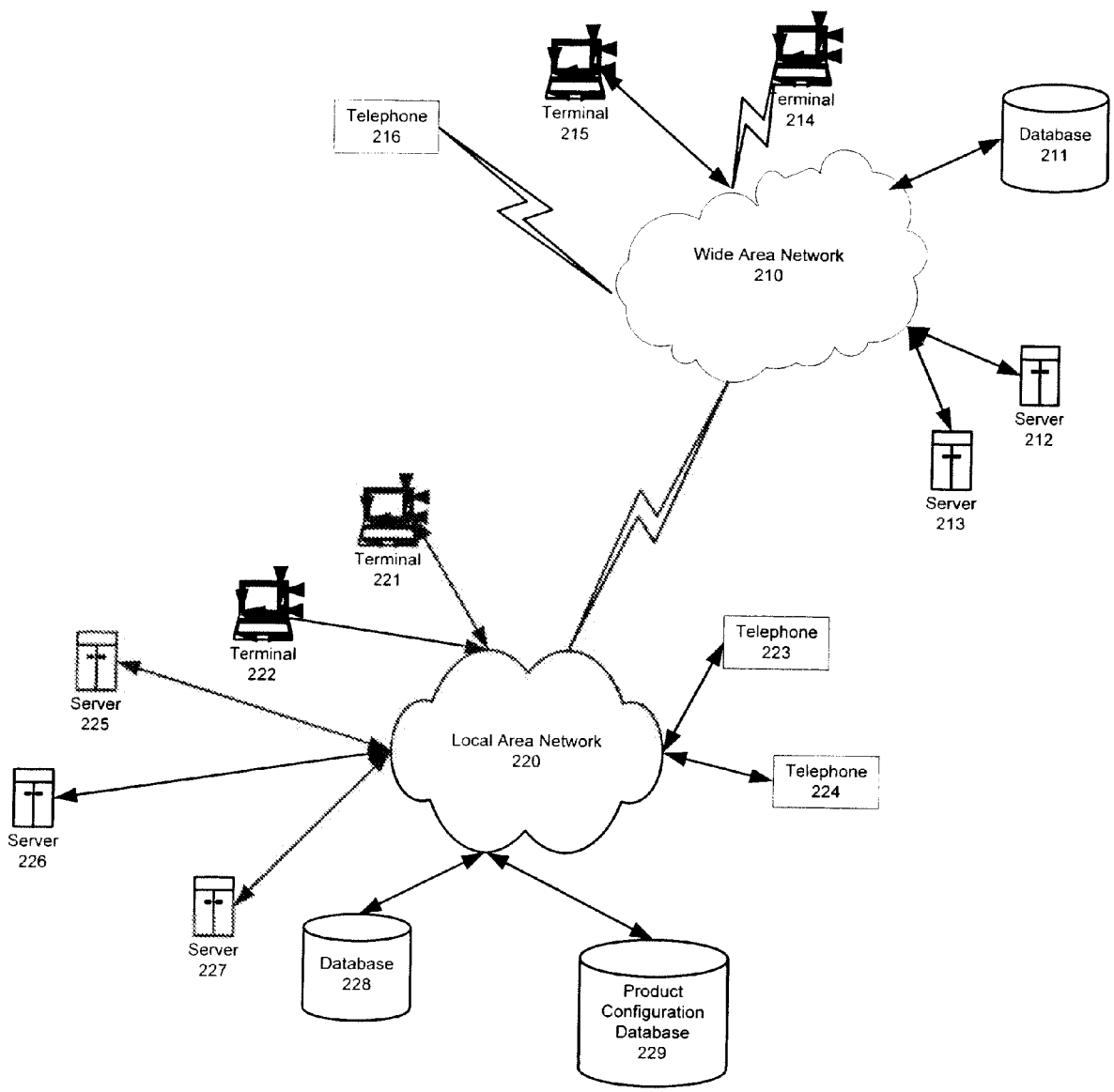
FIG. 2 is a system level diagram of the various components and resources according to the invention.

Referring now to FIG. 2, the Adaptive Product Configuration Model 102 of FIG. 1 can be implemented in a local area network 220 within a corporate structure or can incorporate data from sources located locally or connected through a wide area network 210 such as, but not limited to, connectivity through the Internet. Likewise, the system for performing the method, software or firmware containing the instruction set for performing the method can be processed within servers (225, 226, 227) located on the local area network 220 or servers (213, 212) located on the wide area network or a combination of these servers (213, 212, 225, 226, 227). The data utilized by the method can be stored in databases (211, 228, 229) located in either the local area network 220, wide area network 210 or a combination of these. The product configuration database 229 is shown as a separate element for simplicity. However, the product configuration database 229 could be part of any of the databases accessible to the application software or firmware that implements the Adaptive Product Configuration Model 102. Finally, additional information can be entered by an operator through terminals (215, 214, 221, 222) or could be conveyed verbally to the operator by telephone (216, 223, 224), facsimile machine, or other commonly known means. Modifications to the thresholds and goals used to rate the product configurations are an example of the type of data that could be input manual through the terminals (215, 214, 221, 222).

FIG. 2 shows a limited number of elements (terminals, telephones, servers, databases); however, the environment is not intended to limit the structure of the elements and is used only as a means for description. Those familiar with the art would understand the variations possible in networked environments.

Figure 3:
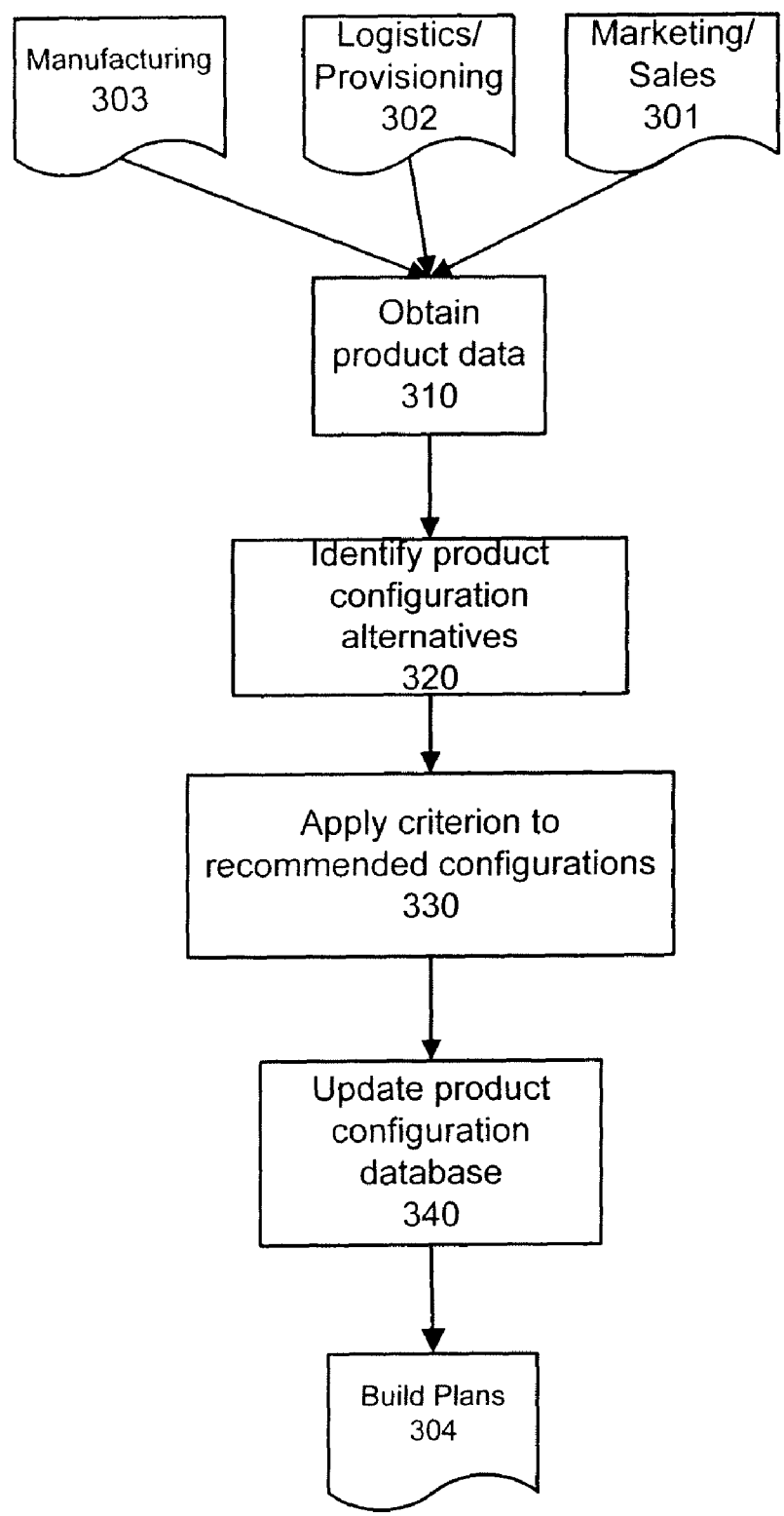
FIG. 3 is a block diagram of the elements within the Adaptive Product Conditioning model.

A schematic of the Adaptive Product Configuration Model is given in FIG. 3. The Adaptive Product Configuration Model would obtain the existing product data at step 310. These data could be supplied either manually or electronically by the various company organizations such as manufacturing 303, logistics/provisioning 302, and marketing/sales 301. These data provided by these sources can be but are not limited to:
1. engineering specifications for each existing product offered by the company,
2. logistics parts and provisioning databases,
3. financial data such as sales projections, margin targets, revenue predictions and marketing goals, production costs, distribution costs, etc., and
4. customer demand and market trends data.

These data can be provided in the form of an inventory statement and product configuration rules as well as sales plans and build plans. Product configuration rules would include but not be limited to those technical and manufacturing restrictions that define how various components can be assembled to form various product configurations. For example, the power consumption requirements of a specific component could limit the types of assemblies in which a component could be configured and would thus be included as one of the product configuration rules. It should be understood by those skilled in the art that the invention is not limited to the example product configuration rules described for this invention. In addition to inventory statements and product configuration rules, design thresholds would also be established either as part of the initial implementation or entered as updates during the operation of the model.

For example, a component supplier is planning to transition from a 14" XGA panel to a 15" XGA panel and will no longer supply or support the 14" XGA. To accelerate its customer' acceptance of 15" XGA panels, the vendor has offered a computer manufacturing company a volume discount of such panels. The computer manufacturing company using the Adaptive Product Configuration Model would analyze their existing product configurations by assessing the inventory statements and applying the configuration rules to develop alternate configurations at step 320 using the discounted 15" XGA.

The Adaptive Product Configuration Model would then compare and analyze the alternatives at step 330 to create a set of recommended product configurations. Step 330 would perform the analysis using various criteria selected from a group to include: maximizing revenue of said build plan; maximizing profitability of said build plan; minimizing liability costs for under-utilizing said inventory statement; minimizing penalty costs for violating desired customer services levels; minimizing penalty costs for deviating from sales plan of said set of existing product configurations; and maximizing a goodness value function of the product configuration.

The goodness value function is a means for rating the alternative product configurations. The goodness value function uses one or more of the following criterion to rank the proposed alternatives: profitability of said product configurations; competitive advantage gain of said product configuration; marketability of said product configurations; compatibility of said product configurations with said set of existing product configurations; and cannibalization of a new product configuration with said set of existing product configurations.

Step 340 would then develop build plans for the recommended configurations to include but not be limited to contractual agreements describing upside and downside volume flexibility of supply-committed component inventories; product substitution rules defining one or more alternative products for an existing end product; and upside demand potential relative to a top-level sales plan.

Finally, the product configuration database would be updated at step 340. These build plans could be distributed to various organizations within the company such as manufacturing, sales/marketing, and logistics and distribution as described previously relative to FIG. 1.

An Illustrative Example

To further illustrate the invention, the following describes a problem solved by the invention and contrasts it with the prior art. While the example refers to the planning and manufacturing of personal computers (PCs) the invention disclosed is not limited to PCs but would be understood by those skilled in the art to include any parts and/or components corresponding to any product build.

Consider the case of three PC product families, F1, F2 and F3, which might represent low-end, mid-range, and high-end portable computers. Each product family comprises one or more pre-defined product configurations, P1 to P10, as displayed in Table 1. The product configurations P1 to P4 belong to product family F1, P5 to P7 belong to family F2, and P8 to P10 belong to family F3. The table further indicates the bill-of-materials of each product configuration. For example, the assembly of product configuration P1 requires one unit of 14" XGA panel, one unit of 20.0 GB hard drive, one unit of DVD optical drive, and one unit of wireless hardware WiFi B. The three product families differ by the size and type of panel used in their bill-of-materials: configurations in family F1 require a 14" XGA panel, whereas configurations in family F2 require a 15" XGA panel, and configurations in family F3 require a 15" SXGA+ panel.

TABLE 1

Bill-of-materials of original product configurations.

|  |  | Family F1 | | | | Family F2 | | | Family F3 | | |
| --- | --- | --- | --- | --- | --- | --- | --- | --- | --- | --- | --- |
| PC Components | | P1 | P2 | P3 | P4 | P5 | P6 | P7 | P8 | P9 | P10 |
| Panels | 14" XGA | 1 | 1 | 1 | 1 | | | | | | |
| | 15" XGA | | | | | 1 | 1 | 1 | | | |
| | 15" SXGA+ | | | | | | | | 1 | 1 | 1 |
| Hard Drives | 20.0 GB | 1 | 1 | 1 | | | | | | | |
| | 40.0 GB | | | | 1 | | | | | | |
| | 60.0 GB | | | | | 1 | 1 | | 1 | | |
| | 80.0 GB | | | | | | | 1 | | 1 | 1 |
| Optical Drives | DVD | 1 | 1 | | 1 | | | | 1 | | |
| | CD-RW | | | 1 | | 1 | 1 | | | 1 | |
| | Combo | | | | | | | 1 | 1 | | 1 |
| Wireless Hardware | WiFi A | | 1 | | | 1 | | 1 | 1 | 1 | |
| | WiFi B | 1 | | 1 | 1 | | 1 | | | | 1 |

Next, it is assumed that the demand forecast is 1,000 units for each of the product configurations P1 to P10. (The demand forecast is a sales projection over a pre-defined planning horizon such as a week, month or quarter).

To determine the corresponding component supply, the top-level demand forecast is exploded through the bill-of-materials in a standard MRP-type calculation. Table 2 shows the component supply requirements pertaining to the top-level demand forecast. The supply requirements are passed along to component suppliers in a supply-demand collaboration process, and the manufacturing company requests a supply commitment to its supply requirements. The supply commitment indicates a supplier's capability to deliver to the manufacturer's supply requirements. The right-most column in Table 2 shows a sample supply commitment.

TABLE 2

Component supply requirements and supply commitment.

| PC Components | | Supply Requirement | Supply Commitment |
| --- | --- | --- | --- |
| Panels | 14" XGA | 4,000 | 2,000 |
| | 15" XGA | 3,000 | 8,000 |
| | 15" SXGA+ | 3,000 | 3,000 |
| Hard Drives | 20.0 GB | 3,000 | 3,600 |
| | 40.0 GB | 1,000 | 1,500 |
| | 60.0 GB | 3,000 | 3,600 |
| | 80.0 GB | 3,000 | 4,000 |
| Optical Drives | DVD | 3,000 | 4,000 |
| | CD-RW | 4,000 | 4,800 |
| | Combo | 3,000 | 3,600 |
| Wireless Hardware | WiFi A | 5,000 | 6,500 |
| | WiFi B | 5,000 | 6,000 |

Comparing the supply requirements with the supply commitment indicates a supply constraint on the 14" XGA panels. To mitigate the supply constraint, the panel supplier committed a higher than requested supply volume for the 15" XGA panel, i.e., 8,000 units versus 3,000 units that were requested.

For this data, conventional Material Requirements Planning (MRP) systems and other support tools for helping companies decide what to build would match the supply to the proposed demand forecast and provide an optimized build plan. A build plan created by such a tool is displayed in Table 3. Notice that due to the limited supply of 14" XGA panels the build plan results in 1,000 backorders for product configurations P1 and P4.

TABLE 3

Build plan generated by a conventional MRP system.

| | Family F1 | | | | Family F2 | | | Family F3 | | |
| --- | --- | --- | --- | --- | --- | --- | --- | --- | --- | --- |
| | P1 | P2 | P3 | P4 | P5 | P6 | P7 | P8 | P9 | P10 |
| Demand Forecast | 1000 | 1000 | 1000 | 1000 | 1000 | 1000 | 1000 | 1000 | 1000 | 1000 |
| Production Plan | — | 1000 | 1000 | — | 1600 | 1000 | 1600 | 1000 | 1000 | 1000 |
| Backorders | 1000 | — | — | 1000 | — | — | — | — | — | — |
| Backorder costs | $50,000 | — | — | $50,000 | — | — | — | — | — | — |

Table 4 displays the consumed and excess component supply that results from the build plan shown in Table 3.

TABLE 4

Consumed supply, excess supply, and liability costs for the build plan generated by a conventional MRP system.

| PC Components | | Supply Requirement | Supply Commitment | Consumed Supply | Excess Supply | Liability Costs |
| --- | --- | --- | --- | --- | --- | --- |
| Panels | 14" XGA | 4,000 | 2,000 | 2,000 | — | — |
| | 15" XGA | 3,000 | 8,000 | 4,200 | 3,800 | $3,800 |
| | 15" SXGA+ | 3,000 | 3,000 | 3,000 | — | — |
| Hard Drives | 20.0 GB | 3,000 | 3,600 | 2,000 | 1,600 | $1,600 |
| | 40.0 GB | 1,000 | 1,500 | — | 1,500 | $1,500 |
| | 60.0 GB | 3,000 | 3,600 | 3,600 | — | — |
| | 80.0 GB | 3,000 | 4,000 | 3,600 | 400 | $ 400 |
| Optical Drives | DVD | 3,000 | 4,000 | 1,000 | 3,000 | $3,000 |
| | CD-RW | 4,000 | 4,800 | 4,600 | 200 | $ 200 |
| | Combo | 3,000 | 3,600 | 3,600 | — | — |
| Wireless Hardware | WiFi A | 5,000 | 6,500 | 6,200 | 300 | $ 300 |
| | WiFi B | 5,000 | 6,000 | 3,000 | 3,000 | $3,000 |

For illustrative purposes, it can be assumed that the total cost of a build plan is the sum of a) the cost of unfilled demand (backorder costs) and b) the cost of unused component inventory (liability costs). If the backorder cost per unit of unfilled demand is $50 and the liability cost per unit of unused component inventory is $1, the above build plan generates a backorder cost of $100,000 and a liability cost of $13,800 as shown in Tables 3 and 4. The total cost of the build plan is thus $113,800.

It was observed that the above build plan results in excess supply of several key components, in particular 3,800 units of 15" XGA panels and a total of 3,100 units between the 20.0 GB and 40.0 GB hard drives. In order to better utilize the excess supply, it might be desirable to build and sell a product configuration made up of a 15" XGA panel and a 20.0 GB or 40.0 GB hard drive. However none of the original product configurations in Table 1 offer such a combination.

This observation helps establish a guideline for the new Adaptive Product Configuration Model. Based on business or technical design considerations, excess component inventory during the planning horizon can be handled by intelligently expanding the set of product configurations. The Adaptive Product Configuration Model described in this invention would determine new product configurations and the best possible build plan using various criteria as described on page 6.

For the above example, the Adaptive Product Configuration Model creates a set of three new product configurations, N1 to N3, shown in Table 5. All the components utilized in their bill-of-materials have excess supply.

TABLE 5

Bill-of-materials data for the new product configurations.

| PC Components | | New Product Offerings | | |
|---|---|---|---|---|
| | | N1 | N2 | N2 |
| Panels | 14" XGA | | | |
| | 15" XGA | 1 | 1 | 1 |
| | 15" SXGA+ | | | |
| Hard Drives | 20.0 GB | 1 | 1 | |
| | 40.0 GB | | | 1 |
| | 60.0 GB | | | |
| | 80.0 GB | | | |
| Optical Drives | DVD | 1 | 1 | 1 |
| | CD-RW | | | |
| | Combo | | | |
| Wireless Hardware | WiFi A | 1 | | 1 |
| | WiFi B | | 1 | |

With the so expanded set of product configurations P1 to P10 and N1 to N3, the Adaptive Product Configuration Model generates a new build plan as displayed in Table 6.

TABLE 6

Build plan generated by the Adaptive Product Configuration Model.

| | Family F1 | | | | Family F2 | | | Family F3 | | | New Product Offerings | | |
|---|---|---|---|---|---|---|---|---|---|---|---|---|---|
| | P1 | P2 | P3 | P4 | P5 | P6 | P7 | P8 | P9 | P10 | N1 | N2 | N3 |
| Demand Forecast | 1000 | 1000 | 1000 | 1000 | 1000 | 1000 | 1000 | 1000 | 1000 | 1000 | — | — | — |
| Production Plan | — | — | 1000 | 1000 | 1000 | 1600 | 1400 | 1000 | 1000 | 1000 | 1200 | 1400 | 400 |
| Backorders | 1000 | 1000 | — | — | — | — | — | — | — | — | — | — | — |
| Backorder costs | $50,000 | $50,000 | — | — | — | — | — | — | — | — | — | — | — |

Table 7 displays the consumed and excess component supply that results from the build plan shown in Table 6.

TABLE 7

Consumed supply, excess supply, and liability costs for the build plan generated by the Adaptive Product Configuration Model.

| PC Components | | Supply Requirement | Supply Commitment | Consumed Supply | Excess supply | Liability costs |
|---|---|---|---|---|---|---|
| Panels | 14" XGA | 4,000 | 2,000 | 2,000 | — | — |
| | 15" XGA | 3,000 | 8,000 | 7,000 | 1,000 | $1,000 |
| | 15" SXGA+ | 3,000 | 3,000 | 3,000 | — | — |
| Hard Drives | 20.0 GB | 3,000 | 3,600 | 3,600 | — | — |
| | 40.0 GB | 1,000 | 1,500 | 1,400 | 100 | $ 100 |
| | 60.0 GB | 3,000 | 3,600 | 3,600 | — | — |
| | 80.0 GB | 3,000 | 4,000 | 3,400 | 600 | $ 600 |
| Optical Drives | DVD | 3,000 | 4,000 | 4,000 | — | — |
| | CD-RW | 4,000 | 4,800 | 4,600 | 200 | $ 200 |
| | Combo | 3,000 | 3,600 | 3,400 | 200 | $ 200 |
| Wireless Hardware | WiFi A | 5,000 | 6,500 | 6,000 | 500 | $ 500 |
| | WiFi B | 5,000 | 6,000 | 6,000 | — | — |

Once again assuming that the backorder cost is $50 and the liability cost is $1, the build plan in Table 6 produces a backorder cost of $100,000 and inventory liability costs of $2,600. The total cost of the build plan generated by the invention is thus $102,600 which in this particular instance represents a 9.8% reduction of total costs and an 82.2% reduction of liability costs when compared to the conventional method.

In recapitulation, and as illustrated in the example above, the Adaptive Product Configuration Model begins with an initial set of product configurations; their demand forecasts and component supply commitments for a pre-determined planning horizon. Once a feasible production plan for the end products has been determined, it evaluates whether inventory liability costs can be reduced by introducing new product configurations. This process is iterative and might take into account one or more cost drivers as explained above.

Mathematical Formulation of the Problem

The Adaptive Product Configuration Model involves solving a master optimization problem and a dual optimization problem in an iterative algorithm. The master problem develops an optimal build plan for a recommended set of configurations, including a set of original product configurations and zero or more new configurations. The dual problem determines the best new configuration to be added to the existing set such that an objective selected from a group of various criteria is optimized. The following provides an exemplary embodiment of the invention and describes a mathematical model involved in the Adaptive Product Configuration Model. It is assumed without loss of generality that the objective is to minimize the sum of liability costs and backorder costs. Those skilled in the art will recognize that the invention can be practiced with modification within and scope of the appended claims.

The following notation will be used to describe the model formulation and data:

I: set of components, indexed by i.
S: set of commodities, or component groups, indexed by s.
M: set of existing product configurations indexed by m.
N: set of recommended new configurations, indexed by n. The cardinality of this set will increase during the solution process.
r[i,m]: usage rate of component i in configuration m.
g[i,s]: relationship between component i and commodity s. g[i,s]=1 if component i belongs to commodity s; 0 otherwise.
$C_h[i]$: liability cost per unit of excess supply of component i.
$C_b[m]$: backorder cost per unit of product configuration m.
$C_o[m]$: overproduction cost per unit of product configuration m.
$C_p[n]$: product release cost per unit of new configuration n.
$C_s[m, m']$: cost of substituting product m' to satisfy demand for product m.
d[m]: demand forecast for product configuration m.
b[m]: backorder quantity of product configuration m.
α: demand upside potential, or maximum percentage of overproduction.
w[i]: supply-committed inventory of component i.
$w_U[i], w_L[i]$: upper and lower bounds of supply-committed inventory of component i.
q[i]: on hand inventory of component i.
T[m,m']: product substitution matrix; T[m,m']=1 if product configuration m can be substituted by product configuration m'; 0 otherwise.
x[m,m']: quantity of product m' produced to satisfy demand for product m.
z[m]: amount of product m overproduced, i.e., the amount exceeding the demand forecast of product m.
$r_n[i, n]$: usage rate of component i in new product configuration n; each column of this matrix represents a new configuration.
X[m]: build quantity of existing product configuration m.
Y[n]: build quantity of new product configuration n.

With the notation defined above, the master optimization problem is introduced as follows:

Master problem $$\text{Min} \sum_{m \in M} \left( \sum_{m' \in M} C_S[m, m']x[m, m'] + \sum_{m' \in M} C_S[m', m]x[m', m] \right) + \quad (1)$$

$$\sum_{m \in M_0} C_b[m]b[m] +$$

$$\sum_{i \in I} C_h[i]\left(w[i] + q[i] - \sum_{m \in M} r[i, m]X[m] - \sum_{n \in N} r_n[i, n]Y[n]\right) +$$

$$\sum_{m \in M} C_O[m]z[m] + \sum_{n \in N} C_p[n]Y[n]$$

Subject to $$d[m] - \sum_{m' \in M} x[m, m']T[m, m'] + \sum_{m' \in M} x[m', m]T[m', m] - \quad (2)$$

$$b[m] + z[m] = X[m] \geq 0 \text{ for all } m \in M$$

$$(1 + \alpha) \sum_{m \in M} d[m] - \sum_{m \in M} X[m] - \sum_{n \in N} Y[n] \geq 0 \quad 3)$$

$$w[i] + q[i] - \sum_{m \in M} r[i, m]X[m] - \sum_{n \in N} r_n[i, n]y[n] \geq 0 \text{ for all } i \in I \quad (4)$$

$$w[i] \leq w_U[i] \text{ for all } i \in I \quad (5)$$

$$w[i] \geq w_L[i] \text{ for all } i \in I \quad (6)$$

The five summation terms in (1) are the costs for substitutions, the costs for backlogging demand, the costs for holding inventory, the costs for overproducing existing products, and the costs for producing new configurations, respectively. Constraint (2) ensures that the production quantity for an existing product configuration is always non-negative. Constraint (3) limits the total build quantity of all existing and new product configurations such that it does not exceed a certain tolerance (the demand upside potential) over and above the original demand forecast. Constraint (4) makes sure that the required quantity for a component does not exceed the available supply for this component. Constraints (5) and (6) represent contractual agreements describing upside and downside volume flexibility of supply-committed component inventories.

The master problem can be solved in various ways, including linear programming and heuristic techniques (e.g. local search techniques). After the master problem is solved, it is straightforward to obtain the dual variables from the solution directly. For this purpose, let π be the dual variable associated with constraint (3), and let λ[i] be the dual variable associated with constraint set (4).

Before the dual problem is defined, the following additional variables are introduced.

K[i]: bill-of-materials of new product configuration; K[i]=1 if the new product configuration uses component i; 0 otherwise.

With the notation defined above, the dual optimization problem is introduced as follows.

Dual problem $$\text{Min} \sum_{i \in I} (-C_h[i] + \lambda[i])K[i] + \pi \quad (7)$$

Subject to $$\sum_{i \in I} K[i]g[i,s] = 1 \quad \text{for all } s \in S \quad (8)$$

$$K[i] \in \{0, 1\} \quad \text{for all } i \in I \quad (9)$$

Constraints (8) and (9) reflect the fact that a new product configuration must contain a squared set of components, meaning that its bill-of-materials must contain exactly one component i from each commodity group s (for example, one hard drive, one panel, etc.).

The dual problem is a 0-1 integer programming problem and can be solved by conventional integer programming tools as well as various heuristic techniques or artificial intelligence techniques. After the dual problem is solved, the optimized objective value (7) is evaluated. If it is negative, the new product configuration is added to the current set of configurations and the master problem (I) is solved over again. Otherwise the algorithm has reached optimality.

While the invention has been described in terms of a single preferred embodiment, those skilled in the art will recognize that the invention can be practiced with modification within the spirit and scope of the appended claims.

What is claimed is as follows:

1. A computer-implemented method comprising the steps of:
   inputting into one or more computers an inventory statement which comprises a plurality of existing product configurations and a plurality of components corresponding to each of said plurality of existing product configurations;
   inputting into said one or more computers product configuration rules which govern assembly of one or more of said plurality of components into product configurations which include said plurality of existing product configurations;
   applying, with said one or more computers, the product configuration rules to an excess of at least one component of at least one existing product configuration of said plurality of existing product configurations of said inventory statement;
   generating, with said one or more computers, a build plan for said product configurations which includes one or more of said plurality of existing product configurations and at least one new product configuration which is different from each of said plurality of existing product configurations which consumes at least one of said excess of said at least one component from said inventory statement,
   wherein said step of generating the build plan utilizes an integrated master optimization problem solving and dual optimization problem solving strategy in said one or more computers, wherein said integrated master optimization problem solving and dual optimization problem solving strategy accounts for
   a) costs for substitutions, costs for backlogging demand, costs for holding inventory, costs for over-producing existing product configurations, and costs for producing said new product configurations;
   b) ensuring production quantity for an existing product configuration is always non-negative;
   c) limiting total build quantity of said existing product configurations and said new product configurations to a specified tolerance over an original demand forecast;
   d) assuring a required quantity of said at least one component does not exceed a supply of said at least one component;
   e) conforming to contractual agreements on supply-committed component inventories; and
   f) assuring said at least one new product configuration contains a squared set of components.

2. The method according to claim 1, including a step of inputting into said one or more computers a sales plan of said at least one of said existing product configuration and a product substitution plan.

3. The method according to claim 2, wherein said step of generating said build plan includes at least one of a criterion selected from a group comprising:
   maximizing revenue of said build plan;
   maximizing profitability of said build plan;
   minimizing liability costs for under-utilizing said inventory statement;
   minimizing penalty costs for violating desired customer services levels;
   minimizing penalty costs for deviating from sales plan of said set of existing product configurations; and
   maximizing a goodness value function of said product configurations.

4. The method of claim 3 wherein said goodness value function utilizes at least one of:
   profitability of said product configurations;
   competitive advantage gain of said product configuration;
   marketability of said product configurations;
   compatibility of said product configurations with said existing product configurations; and
   cannibalization of said new product configuration with said existing product configurations.

5. The method of claim 3 wherein generating a build plan includes a step of formulating constraints utilizing at least one of:
   contractual agreements describing upside and downside volume flexibility of supply-committed component inventories; and
   upside demand potential relative to a top-level sales plan.

6. The method of claim 3, wherein said step of generating a build plan comprises a relationship:

$$\text{Min} \sum_{m \in M} \left( \sum_{m' \in M} C_S[m, m']x[m, m'] + \sum_{m' \in M} C_S[m', m]x[m', m] \right) + \quad (1)$$

$$\sum_{m \in M_0} C_b[m]b[m] +$$

$$\sum_{i \in I} C_h[i]\left(w[i] + q[i] - \sum_{m \in M} r[i, m]X[m] - \sum_{n \in N} r_n[i, n]Y[n]\right) +$$

$$\sum_{m \in M} C_O[m]z[m] + \sum_{n \in N} C_p[n]Y[n]$$

-continued subject to:

$$d[m] - \sum_{m' \in M} x[m, m']T[m, m'] + \sum_{m' \in M} x[m', m]T[m', m] - \qquad (2)$$
$$b[m] + z[m] = X[m] \geq 0 \text{ for all } m \in M$$

$$(1 + \alpha)\sum_{m \in M} d[m] - \sum_{m \in M} X[m] - \sum_{n \in N} Y[n] \geq 0 \qquad (3)$$

$$w[i] + q[i] - \sum_{m \in M} r[i, m]X[m] - \sum_{n \in N} r_n[i, n]y[n] \geq 0 \text{ for all } i \in I \qquad (4)$$

$$w[i] \leq w_U[i] \text{ for all } i \in I \qquad (5)$$

$$w[i] \geq w_L[i] \text{ for all } i \in I \qquad (6)$$

wherein, a set of variables of said relationship includes:
I as the set of components, indexed by i,
S as the set of commodities, or component groups, indexed by s,
M as the set of existing product configurations indexed by m,
N as the set of recommended new configurations, indexed by n, wherein, the cardinality of this set will increase during the solution process,
r[i,m] is the usage rate of component i in configuration m,
g[i,s] is the relationship between component i and commodity s, wherein g[i,s]=1 if component i belongs to commodity s; 0 otherwise,
$C_h[i]$ is the liability cost per unit of excess supply of component i,
$C_b[m]$ is the backorder cost per unit of product configuration m,
$C_o[m]$ is the overproduction cost per unit of product configuration m,
$C_p[n]$ is the product release cost per unit of new configuration n,
$C_s[m, m']$ is the cost of substituting product m' to satisfy demand for product m,
d[m] is the demand forecast for product configuration m,
b[m] is the backorder quantity of product configuration m,
α is the demand upside potential, or maximum percentage of overproduction,
w[i] is the supply-committed inventory of component i,
$w_U[i]$, $w_L[i]$ are the upper and lower bounds of supply-committed inventory of component i,
q[i] is the on hand inventory of component i,
T[m,m'] is the product substitution matrix; T[m,m']=1 if product configuration m can be substituted by product configuration m'; 0 otherwise,
x[m,m'] is the quantity of product m' produced to satisfy demand for product m,
z[m] is the amount of product m overproduced, i.e., the amount exceeding the demand forecast of product m,
$r_n[i, n]$ is the usage rate of component i in new product configuration n; each column of this matrix represents a new configuration,
X[m] is the build quantity of existing product configuration m, and
Y[n] is the build quantity of new product configuration n.

7. The method according to claim 6, wherein said relationship comprises:

$$\text{Min} \sum_{i \in I} (-C_h[i] + \lambda[i])K[i] + \pi \qquad (7)$$

subject to:

$$\sum_{i \in I} K[i]g[i, s] = 1 \text{ for all } s \in S \qquad (8)$$

$$K[i] \in \{0, 1\} \text{ for all } i \in I \qquad (9)$$

wherein, said set of variables of said relationship includes,
K[i]: bill-of-materials of new product configuration; K[i]=1 if the new product configuration uses component i; 0 otherwise.

* * * * *